United States Patent
Khay-Ibbat et al.

(10) Patent No.: US 9,826,461 B2
(45) Date of Patent: Nov. 21, 2017

(54) PLMN BARRING

(71) Applicant: Apple Inc., Cupertino, CA (US)

(72) Inventors: Samy Khay-Ibbat, San Francisco, CA (US); Tarik Tabet, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/084,697

(22) Filed: Mar. 30, 2016

(65) Prior Publication Data

US 2017/0064608 A1    Mar. 2, 2017

Related U.S. Application Data

(60) Provisional application No. 62/213,512, filed on Sep. 2, 2015.

(51) Int. Cl.
*H04W 48/06* (2009.01)
*H04W 84/04* (2009.01)

(52) U.S. Cl.
CPC .......... *H04W 48/06* (2013.01); *H04W 84/042* (2013.01); *Y02B 60/50* (2013.01)

(58) Field of Classification Search
CPC ..... H04W 48/06; H04W 84/042; Y02B 60/50
See application file for complete search history.

(56) References Cited

U.S. PATENT DOCUMENTS

| | | | | |
|---|---|---|---|---|
| 3,912,108 | A * | 10/1975 | Clayton | H02J 7/0081 320/141 |
| 7,110,419 | B1 * | 9/2006 | Linander | H04L 12/2801 370/461 |
| 8,971,893 | B2 | 3/2015 | Li et al. | |
| 9,042,888 | B2 | 5/2015 | Juang et al. | |
| 2006/0246897 | A1 * | 11/2006 | Jiang | H04W 8/06 455/435.1 |
| 2014/0295824 | A1 | 10/2014 | Madasamy | |
| 2015/0105066 | A1 | 4/2015 | Wu et al. | |

* cited by examiner

*Primary Examiner* — Joseph Dean, Jr.
(74) *Attorney, Agent, or Firm* — Meyertons Hood Kivlin Kowert & Goetzel, P.C.; Jeffrey C. Hood; Michael B. Davis

(57) ABSTRACT

Techniques are disclosed relating to determining whether to bar a public land mobile network (PLMN). In some embodiments, a mobile device is configured to increment a count of failed requests to a PLMN for requests that are explicitly rejected by a base station and not for other requests. In some embodiments, the mobile device is configured to bar the PLMN in response to the count reaching a threshold value. In some embodiments, for requests that fail without explicit rejection, the mobile device is configured to wait a predetermined time interval before transmitting another request to the base station. The time interval may be telescoped for subsequent requests that fail without a rejection. In various embodiments, the disclosed techniques may reduce power consumption while avoiding premature PLMN barring.

18 Claims, 6 Drawing Sheets

---

Increment a count of failed requests in response to determining that a first request associated with a public land mobile network (PLMN) has failed based on rejection of the first request by the base station
710

In response to the count reaching a threshold value, bar the PLMN for a first time interval
720

In response to determining that a second request failed without a rejection of the second request received from the base station, wait at least a second time interval before transmitting another request to the base station, wherein the first time interval is greater than the second time interval
730

PLMN BARRING

PRIORITY INFORMATION

This application claims priority to U.S. provisional patent application Ser. No. 62/213,512, entitled "PLMN Barring," by Samy Khay-Ibbat, et al., filed Sep. 2, 2015, which is hereby incorporated by reference in its entirety as though fully and completely set forth herein.

TECHNICAL FIELD

The present application relates to wireless devices, and more particularly to an apparatus, system, and method for determining when to bar a public land mobile network (PLMN).

DESCRIPTION OF THE RELATED ART

Wireless communication systems are rapidly growing in usage. Additionally, there exist numerous different wireless communication technologies and standards. Some examples of wireless communication standards include GSM, UMTS (WCDMA, TDS-CDMA), LTE, LTE Advanced (LTE-A), 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Wireless communication can be useful for a wide breadth of device classes, ranging from relatively simple (e.g., potentially inexpensive) devices, which may have limited capabilities, to relatively complex (e.g., potentially more expensive) devices, which may have greater capabilities. Such devices may have different characteristics with respect to processing, memory, battery, antenna (power/range, directionality), and/or other capabilities. Devices that exhibit relatively limited reception and/or transmission capabilities (due to device design, device size, battery size, current transmission medium conditions, and/or other factors) may be referred to in some instances as "link budget limited" devices.

Link budget limited devices (among other wireless devices) may experience adverse wireless conditions, e.g., because of low battery levels, local radio interference, etc. In this situation, requests to a base station may fail because of the adverse conditions, rather than because of explicit rejections of the request by the base station. Barring a public land mobile network (PLMN) associated with the base station based on failed requests may be premature (e.g., the PLMN may have sufficient resources for the mobile device) if the failed requests are caused by adverse conditions.

SUMMARY

Techniques are disclosed relating to determining whether to bar a public land mobile network (PLMN). In some embodiments, an apparatus includes one or more processing elements that are configured to, in response to determining that a first request associated with a public land mobile network (PLMN) has failed based on rejection of the first request by the base station, increment a count of failed requests. In some embodiments, the one or more processing elements are further configured to, in response to the count reaching a threshold value, bar the PLMN for a first time interval. In some embodiments, the one or more processing elements are further configured to, in response to determining that a second request failed without a rejection of the second request received from the base station, wait at least a second time interval before transmitting another request to the base station, where the first time interval is greater than the second time interval. In some embodiments, the one or more processing elements are configured not to increment the count in response to failed requests for which a rejection is not received from the base station.

In some embodiments, apparatus includes one or more processing elements that are configured to, in response to determining that a first request associated with a public land mobile network (PLMN) has failed based on rejection of the first request by the base station, increment a count of failed requests. In some embodiments, the one or more processing elements are configured not to increment the count in response to failed requests to the base station for which a rejection is not received from the base station. In some embodiments, the one or more processing elements are configured to, in response to the count reaching a threshold value, bar the PLMN for a first time interval.

In some embodiments, a non-transitory computer-readable medium has instructions stored thereon that are executable by a computing device to perform operations. In some embodiments, the operations include, in response to determining that a first request associated with a public land mobile network (PLMN) has failed based on rejection of the first request by the base station, incrementing a count of failed requests. In some embodiments, the operations include, in response to the count reaching a threshold value, barring the PLMN for a first time interval. In some embodiments, the operations include, in response to determining that a second request failed without a rejection of the second request received from the base station, waiting at least a second time interval before transmitting another request to the base station, wherein the first time interval is greater than the second time interval.

BRIEF DESCRIPTION OF THE DRAWINGS

A better understanding of the disclosed embodiments can be obtained when the following detailed description is considered in conjunction with the following drawings.

Figure 1:
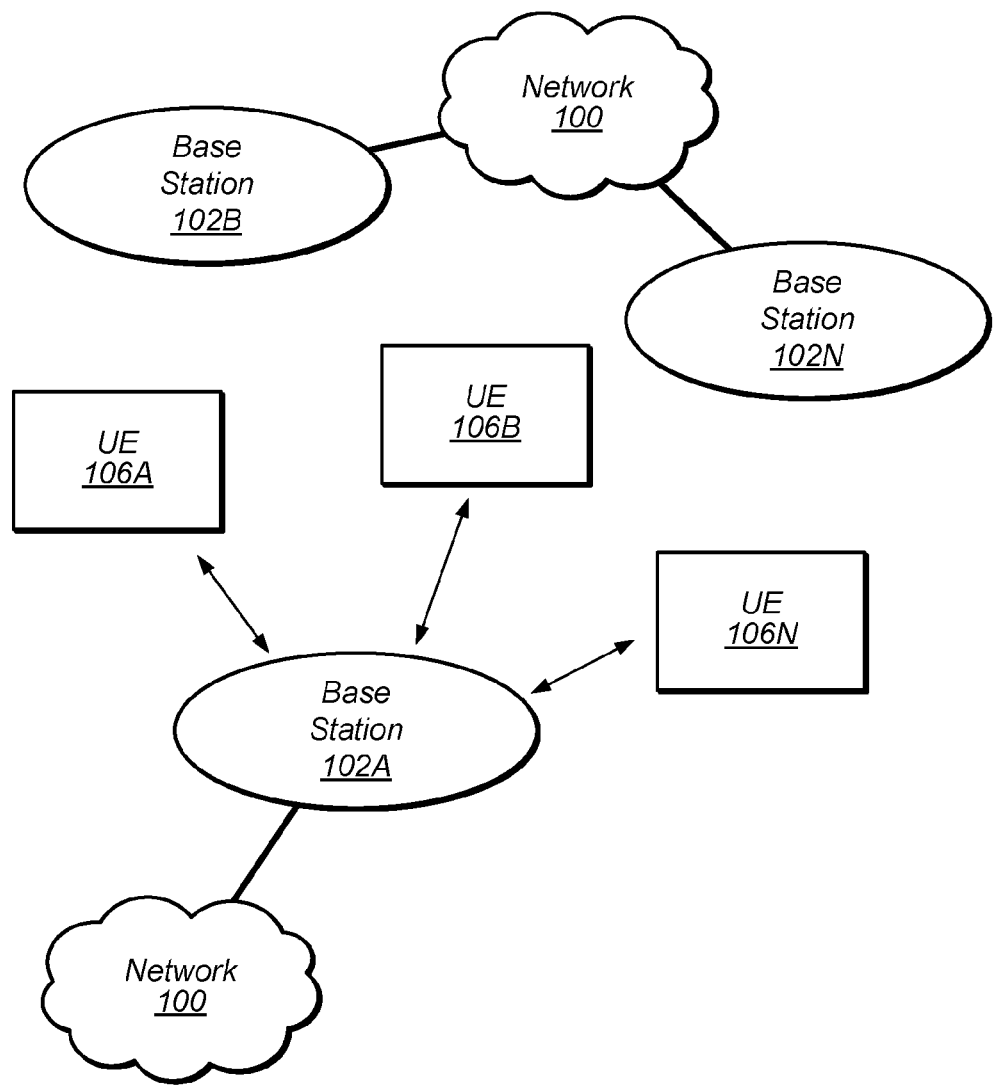
FIG. 1 illustrates an exemplary (and simplified) wireless communication system.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present patent application:

UE: User Equipment
BS: Base Station
ENB: eNodeB (Base Station)
GSM: Global System for Mobile Communication
UMTS: Universal Mobile Telecommunication System
LTE: Long Term Evolution
CS: Circuit-switched
PLMN: Public Land Mobile Network
PS: Packet-switched
CSFB: Circuit-switched fallback
MME: Mobile Management Entity
MSC: Mobile Switching Center
RNC: Radio Network Controller
OAM: Operations, Administration, and Management
RRC: Radio Resource Control
MT: Mobile Terminating
MTRF: Mobile Terminating Roaming Forwarding Terms The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, wearable devices (such as a smart watch), or other handheld devices, etc. In general, the term "UE" or "UE device" can be broadly defined to encompass any electronic, computing, and/or telecommunications device (or combination of devices) which is capable of wireless communication. UE devices may commonly be mobile or portable and easily transported by a user, though in some cases substantially stationary devices may also be configured to perform wireless communication.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since the definition of the term "channel" may differ according to different wireless protocols, the term "channel" as used herein should be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
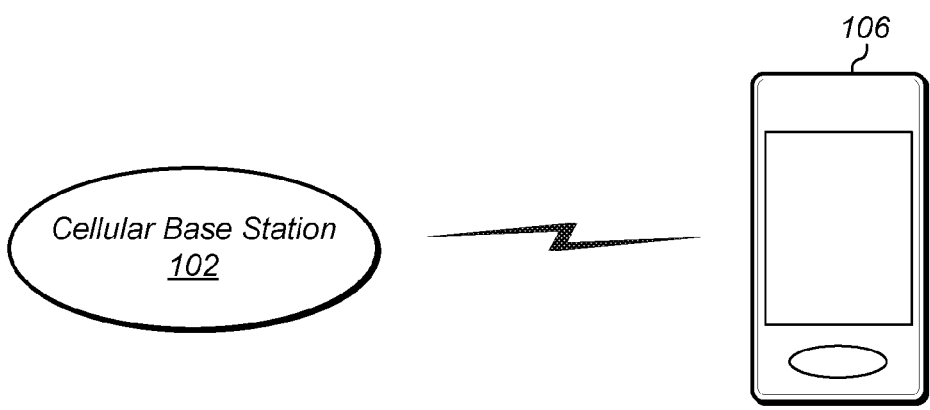
FIG. 2 illustrates a base station in communication with user equipment (UE)

FIGS. 1 and 2—Communication System

FIG. 1 illustrates a simplified example wireless cellular communication system. It is noted that the system of FIG. 1 is merely one example of a possible cellular communication system, and embodiments may be implemented in any of various systems as desired.

As shown, the example wireless cellular communication system includes a base station 102 which communicates over a transmission medium with one or more user devices 106A through 106N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless cellular communication with the UEs 106A through 106N. The base station 102 may also be equipped to communicate with a network 100. Thus, the base station 102 may facilitate communication between the UEs and/or between the UEs and the network 100. The communication area (or coverage area) of each base station may be referred to as a "cell." The base station 102 and the UEs may be configured to communicate over the transmission medium using any of various wireless communication technologies, including cellular radio access technologies (RATs) such as GSM, UMTS, LTE, LTE-Advanced, CDMA, W-CDMA, and any of various 3G, 4G, 5G or future telecom standards. Base station 102 and other similar base stations operating according to the same or a different cellular communication standard may thus be provided as a network of cells, which may provide continuous or nearly continuous overlapping service to UE 106 and similar devices over a wide geographic area via one or more cellular communication standards. Other possible wireless communication technologies include wireless local area network (WLAN or WiFi), WiMAX, etc.

In some embodiments, UE 106 may be capable of communicating using multiple radio access technologies (RATs). For example, the UE 106 might be configured to communicate using two or more of GSM, UMTS, LTE, LTE-Advanced CDMA2000, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with the base station 102. As defined above, the UE 106 may be a device with wireless cellular network connectivity such as a mobile phone, a handheld device, a computer or a tablet, or virtually any type of wireless device. The base station may be a cellular base station that communicates in a wireless cellular manner with one or more UEs. The base station may include a processing element such as one or more of a processor, an ASIC (application specific integrated circuit), an FPGA (field-programmable gate array) or some combination thereof.

The base station, such as the processing element in the base station, may perform any of the methods described herein, or any portion of any of the method embodiments described herein. Other cellular network devices, described below, may also be configured to perform some or all of the methods described herein, possibly in conjunction with the base station.

The UE may include a processing element such as one or more of a processor, an ASIC (application specific integrated circuit), an FPGA (field-programmable gate array) or some combination thereof. The UE, such as the processing element in the UE, may perform any of the methods described herein as being performed by a UE.

In some embodiments, the UE 106 may be configured to communicate using any of multiple wireless communication protocols as described above. The UE 106 may include one or more antennas for communicating using one or more wireless communication protocols. In some embodiments, the UE 106 may share one or more parts of a receive and/or transmit chain between multiple wireless communication standards. The shared radio may include a single antenna, or may include multiple antennas (e.g., for MIMO) for performing wireless communications. In other embodiments, the UE 106 may include separate transmit and/or receive chains (e.g., including separate antennas and other radio components) for each wireless communication protocol with which it is configured to communicate. In still other embodiments, the UE 106 may include one or more radios which are shared between multiple wireless communication protocols, and one or more radios which are used exclusively by a single wireless communication protocol. For example, in one set of embodiments, the UE 106 may include a shared radio for communicating using either of LTE or 1×RTT, and separate radios for communicating using each of Wi-Fi and Bluetooth. Other configurations are also possible.

In some embodiments, the UE 106 may be configured to communicate using either of a first radio access technology which provides packet-switched (PS) services but not circuit-switched (CS) services and a second radio access technology which provides PS services and CS services. If the UE 106 is using the first radio access technology and a CS call is initiated or received, the UE 106 may be capable of switching to use of the second radio access technology in order to establish the call.

The UE may be associated with, e.g., subscribe to, a cellular carrier. Examples of cellular carries in the United States include Verizon, AT&T, Sprint, and T-Mobile. In some embodiments, the UE may subscribe to a home carrier that does not support handover from packet-switched network to a circuit-switched network during an ongoing call.

Figure 3:
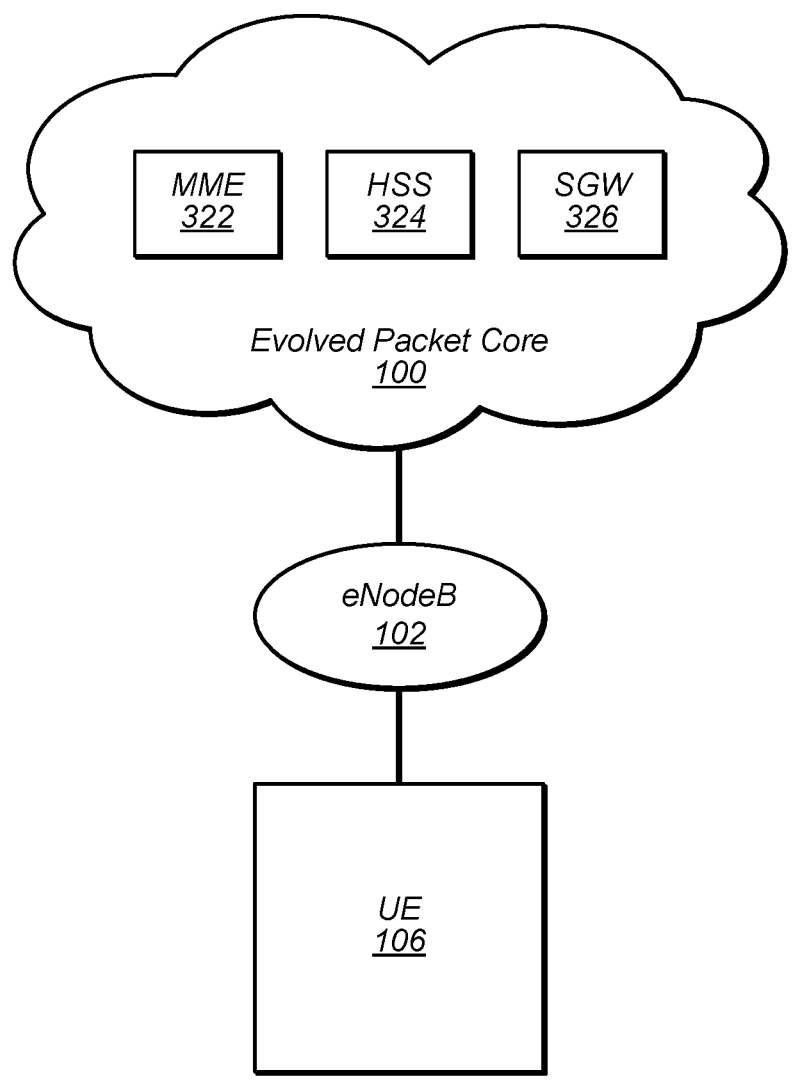
FIG. 3 illustrates an example cellular network system according to some embodiments.

FIG. 3 illustrates an example simplified portion of a wireless communication system that may be particularly useful for implementing voice or video over IP communication, such as voice over LTE (VoLTE) in an LTE network. The UE 106 may be in communication with a cellular network, where the cellular network may comprise a base station 102 and an evolved packet core (EPC) 100, as shown. The base station is shown in this example embodiment as an eNodeB 102. The UE 106 may communicate in a wireless manner with the base station (eNodeB) 102. In turn, the eNodeB 102 may be coupled to a core network, shown in this example embodiment as an evolved packet core (EPC) 100. As shown, the EPC 100 may include mobility management entity (MME) 322, home subscriber server (HSS) 324, and serving gateway (SGW) 326. The EPC 100 may include various other devices known to those skilled in the art as well.

Operations described herein as being performed by the cellular network may be performed by one or more of the cellular network devices shown in FIG. 3, such as one or more of base station, 102, MME 322, HSS 324, or SGW 326 in EPC 100, among possible others.

Figure 4:
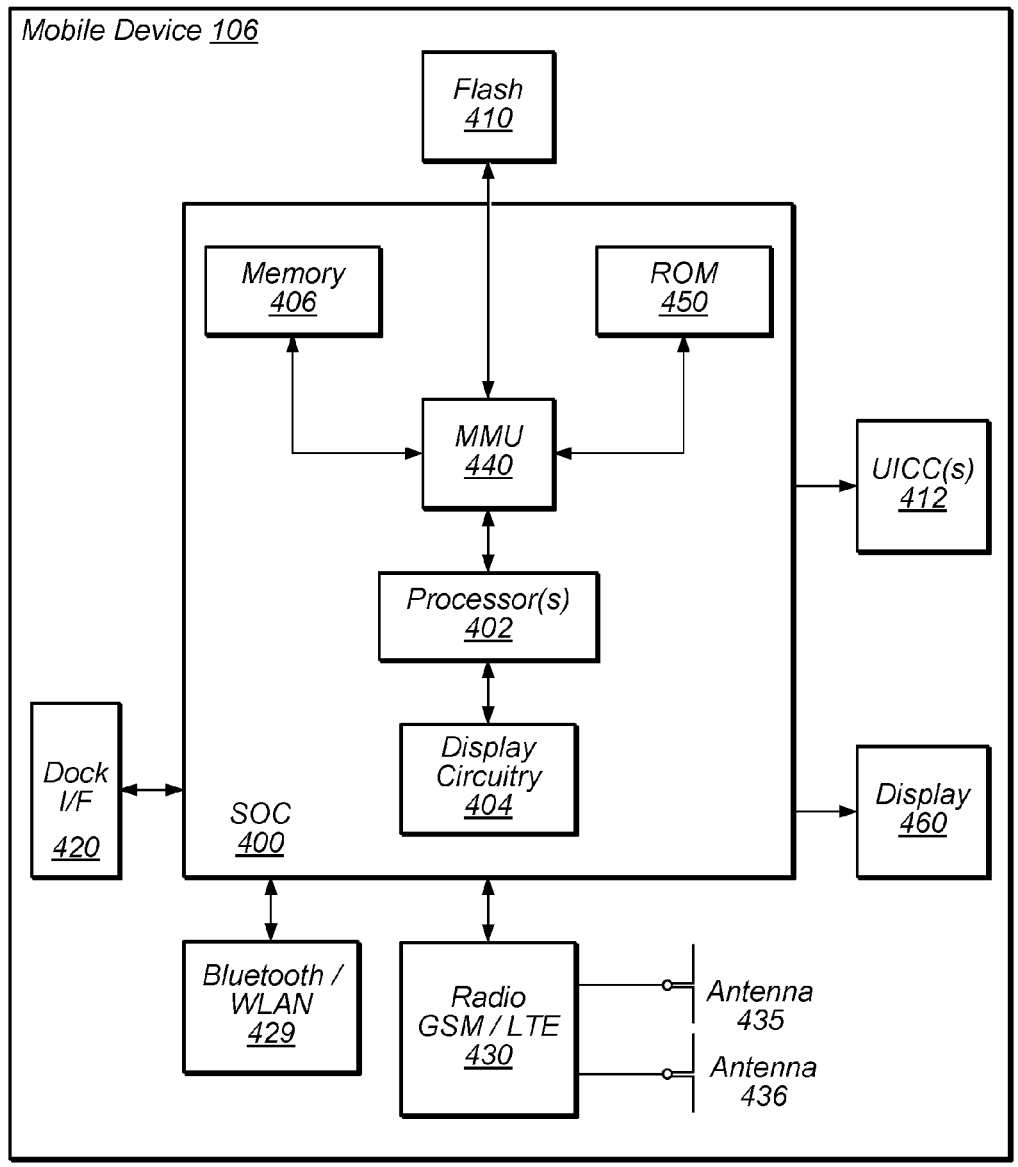
FIG. 4 illustrates an example block diagram of a UE, according to some embodiments.

FIG. 4—Example Block Diagram of a UE

FIG. 4 illustrates an exemplary block diagram of a UE 106. As shown, the UE 106 may include a system on chip (SOC) 400, which may include portions for various purposes. For example, as shown, the SOC 400 may include a processing element, such as processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, radio 430, connector I/F 420, and/or display 460. The MMU 440 may be configured to perform memory protection and page table translation or set up. In some embodiments, the MMU 440 may be included as a portion of the processor(s) 402.

In the embodiment shown, ROM 450 may include a bootloader, which may be executed by the processor(s) 402 during boot up or initialization. As also shown, the SOC 400 may be coupled to various other circuits of the UE 106. For example, the UE 106 may include various types of memory (e.g., including Flash memory 410), a connector interface 420 (e.g., for coupling to the computer system), the display 460, and wireless communication circuitry (e.g., for LTE, LTE-A, CDMA2000, GSM, Bluetooth, WiFi, etc.).

The UE device 106 may include at least one antenna, and in some embodiments multiple antennas, for performing wireless cellular communication with base stations and/or wireless communication with other devices. For example, the UE device 106 may use antenna 435 to perform the wireless cellular communication and may use antenna 436 for other wireless communication. As noted above, the UE may be configured to communicate wirelessly using multiple wireless communication standards (multiple RATs) in some embodiments.

As described herein, the UE 106 may include a processing element, e.g., hardware and/or software components for implementing methods according to embodiments of this disclosure.

The processing element of the UE device 106 may be processor 402 configured to implement part or all of the methods described herein, e.g., by executing program instructions stored on a memory medium (e.g., a non-transitory computer-readable memory medium). In other embodiments, the UE processing element may be configured as a programmable hardware element, such as an FPGA (Field Programmable Gate Array), or as an ASIC (Application Specific Integrated Circuit).

Figure 5:
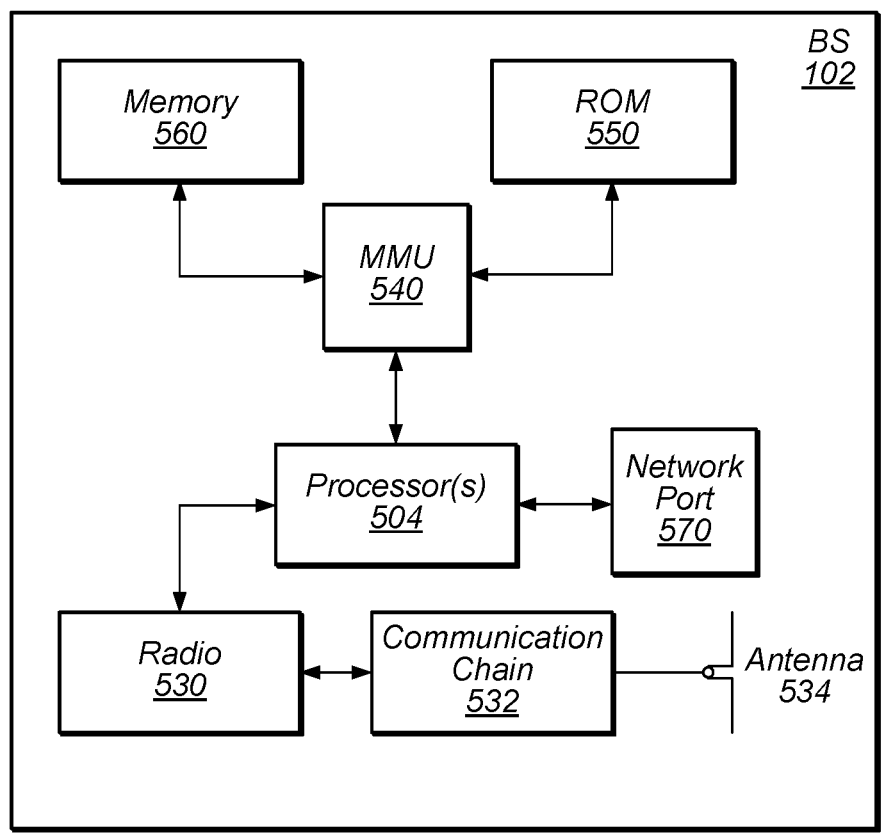
FIG. 5 illustrates an example block diagram of a base station, according to some embodiments.

FIG. 5—Base Station

FIG. 5 illustrates an exemplary block diagram of a base station 102. It is noted that the base station of FIG. 5 is merely one example of a possible base station. As shown, the base station 102 may include a processing element, such as processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, GSM, UMTS, LTE, LTE-A, WCDMA, CDMA2000, etc.

The processing element, such as processor(s) 504, of the base station 102 may be configured to implement part or all of the methods described herein, e.g., by executing program instructions stored on a memory medium (e.g., a non-transitory computer-readable memory medium). Alternatively, the processing element may be configured as a programmable hardware element, such as an FPGA (Field Programmable Gate Array), or as an ASIC (Application Specific Integrated Circuit), or a combination thereof.

Improved PLMN Barring

In some situations, UE 106 is configured to transmit a request to base station 102 such as an attach request, a service request, a tracking area update (TAU) request, etc. UE 106 may be configured to continue sending requests until a request is granted. Based on multiple request failures (e.g., 5), UE 106 may block or bar a PLMN associated with the requests (e.g., for a length of time specified by timer T3402 in LTE, which may be a twelve minute timer). 3GPP TS 24.301 release 13 version 13.2.0, which is incorporated by reference herein in its entirety, explains exemplary situations in which: an attach request is not accepted by the network (section 5.5.1.2.5), a TAU request is not accepted (section 5.5.3.2.5), a service request is not accepted (section 5.6.1.5), and the attempt counter reaches five failed requests (sections 5.5.1.2.6 and 5.5.3.2.6). The T3402 timer is also discussed in further detail in section 5.3.6 of TS 24.301.

In some implementations, the counter for failed requests is updated for both requests that are explicitly rejected by the network (e.g., using an ATTACH REJECT message) and for requests that fail for other reasons (e.g., when limited UL capabilities of the UE prevent the request from even reaching the network). This may be disadvantageous, however, especially for link-budget limited UEs. If UE 106 is link-budget limited, requests may fail often enough to severely limit communications (e.g., because PLMNs are blocked frequently). For example, UE 106 may remove PLMNs from a PLMN list for 12 minutes when UL budget is limited, when it would be preferable for UE 106 not to bar the PLMN(s), but simply to wait for better signal conditions.

As used herein, "barring" a PLMN includes at least: removing the PLMN from a PLMN list, adding the PLMN to a list of PLMNs that a UE should not use, and/or otherwise setting an indication to refrain from using the PLMN over a particular time interval.

Consider, for example, the following two scenarios which may occur in poor radio frequency conditions for a UL-limited device. In scenario A, UE 106 transmits a service request five times with no successful RRC connection established, in stationary conditions. In some implementations, five attempts is a threshold and UE 106 bars the PLMN for 12 minutes after the five failed requests. In scenario B, UE 106 encounters problems during service requests and/or a TAU procedure because the network does not receive some RRC/NAS messages (e.g., because of the UL limits of UE 106). This may lead to the network sending a service reject message and the UE may be implicitly detached once a service request gets through. Therefore, UE 106 may initiate a new attach procedure which may fail five times due to the UL issues. Thus, the UE may bar the PLMN for 12 minutes after five failed attach requests. In some embodiments, UE 106 is configured to avoid or reduce the occurrence of these scenarios.

Depending on the reasons for the failed requests, it may be desirable to refrain from barring the PLMN. Therefore, in some embodiments, UE 106 is configured to increment a failure counter based on whether or not a request is explicitly rejected by the network. For example, in some embodiments UE 106 is not configured to increment the counter unless the requests are explicitly rejected by the network. Therefore, requests that fail to reach the network or are otherwise lost are not be used to increment the counter, in these embodiments.

Figure 6:
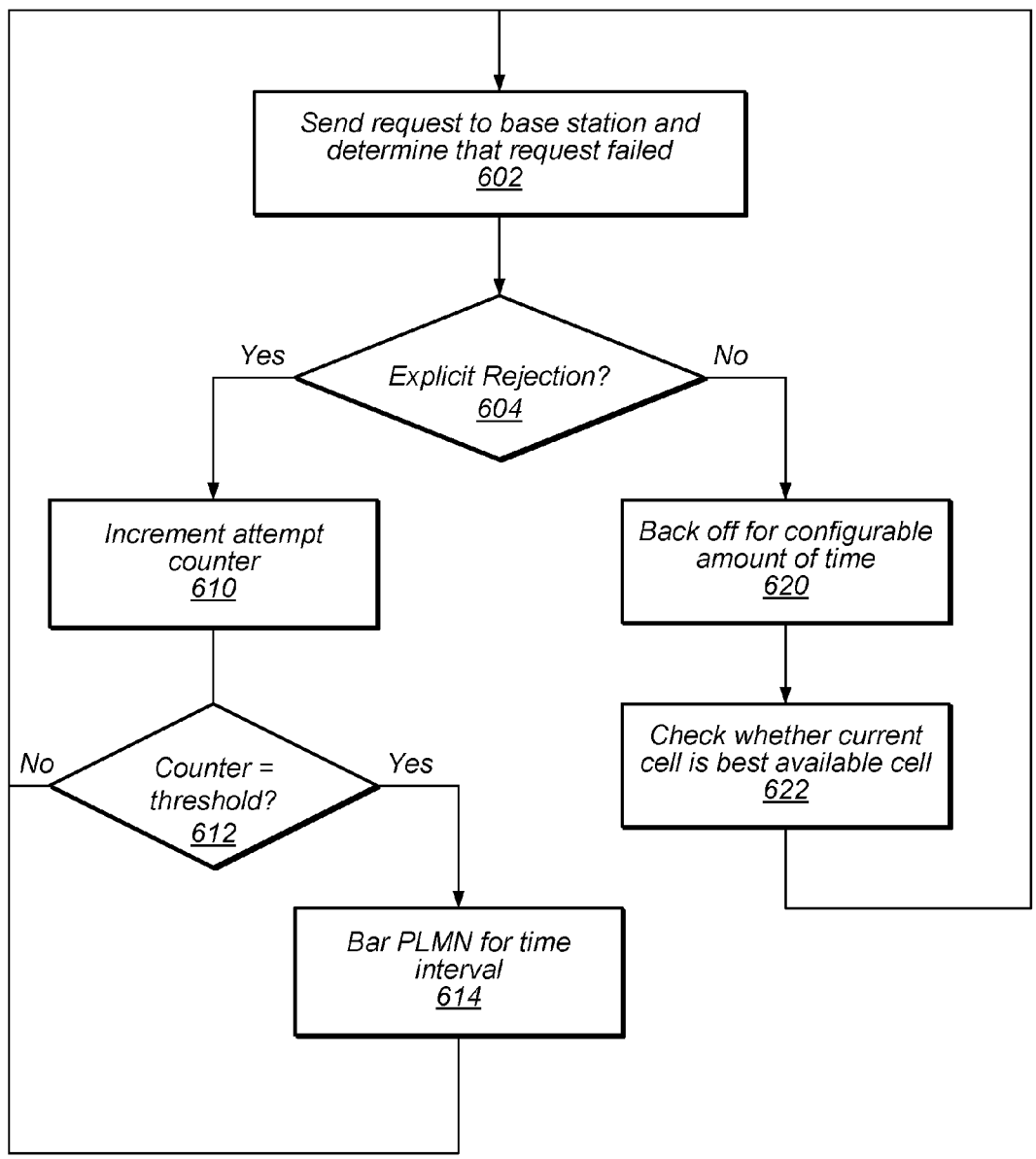
FIG. 6 is a flowchart diagram of a method for improved PLMN barring, according to some embodiments.

FIG. 6 is a flow diagram illustrating a method for improved PLMN barring according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 602, mobile device 106 sends a request to base station 102 and determines that the request failed. The failure may be based on a rejection of the request, failure of the request to reach the network, or any of various other reasons that the request is not granted. In some embodiments, the request is a connection request that is one of: an attach request, a service request, or a TAU request. In some embodiments, the same processing elements and counters may be used to track all three types of requests while in other embodiments separate counters may be used for different types of requests.

For example, in some embodiments, one counter is used for attach requests while another independent counter is used for TAU requests and service requests. Thus, in some embodiments, UE 106 is configured to perform the operations shown in FIG. 6 separately for different types of requests. In some embodiments, the disclosed techniques may be used for various types of connection requests, the disclosed types of requests are not intended to limit the scope of the disclosure.

In some embodiments, the trigger for sending attach requests may include one or more of: powering on UE 106, turning airplane mode off on UE 106, and/or the network indicating that the UE is implicitly detached (e.g., in response to a TAU request or service request).

At 604, mobile device 106 determines whether the request was explicitly rejected. For example, MME 322 may explicitly reject, via base station 102, requests using a reject message to the UE. Thus, the determination in 604 may be made based on whether UE 106 receives a rejection from the base station 102. The reject message may indicate a reason that the request was rejected (e.g., an evolved packet system (EPS) mobility management (EMM) cause value for an attach reject message). Examples of cause values include values indicating: an illegal UE, EPS service not allowed, tracking area not allowed, roaming not allowed in tracking area, no suitable cells, congestion, etc. TS 24.301 version 13.2.0 sets out an exemplary EPS attach procedure and examples of cause values for rejections in section 5.5.1 and an exemplary TAU request procedure in section 5.5.3. In contrast to explicit rejections, if the request never reaches the network, for example, the network cannot reject the request and the request will fail without an explicit rejection (e.g., as determined by lack of response). If the request was explicitly rejected, flow proceeds to 610. Otherwise, flow proceeds to 620.

At 610, mobile device 106 increments an attempt counter. In some embodiments, the attempt counter may be specific to a particular type of request (e.g., an attach request). In some embodiments, the attempt counter may be used for multiple types of requests (e.g., both TAU requests and service requests).

At 612, mobile device determines whether the counter has met a threshold value. As used herein "meeting" a threshold is intended to cover various situations where a counter crosses, equals, is greater than, is less than, etc. relative to a defined threshold value such that a pre-defined trigger condition related to the threshold is detected. If the counter has met the threshold value, flow proceeds to 614 and mobile device 206 bars the PLMN for a time interval (e.g., the T3402 interval, although in other embodiments, any of various appropriate barring time intervals may be implemented). UE 106 may subsequently resume requests to the PLMN after the interval, with flow proceeding back to 602. UE 106 may also search for other PLMNs during the time interval. If the counter is not yet equal to the threshold, UE 106 may not bar the PLMN but may later send more requests to the PLMN with flow proceeding back to 602.

At 620, when the determination in 604 indicates that the rejection is not explicit, UE 106 is configured to back off from making further requests for a configurable amount of time. The amount of time may increase based on the number of failed requests during a time period (which may be described as "telescoping," in which the interval increases upon subsequent occurrences). Backing off may involve refraining from sending requests to the base station, which may conserve power while waiting for wireless conditions to improve, for example. Backing off may involve refraining from communicating with the base station at all in some embodiments or situations, or may involve communicating with the base station but refraining from communicating with the PLMN associated with the request, in some embodiments or situations. The back-off interval may be shorter than the barring interval 614, in some embodiments. For example, the back-off interval may be less than a minute, in some embodiments. In some embodiments, UE 106 may be configured to end the back-off interval early, e.g., in response to movement of UE 106, which may improve signal conditions.

At 622, UE 106 checks whether the current cell is still the best available cell for UE 106. In some embodiments, this is performed based on detecting movement of UE 106, which may indicate that a new cell may be better for the UE. In some embodiments, this is performed based on a physical layer scan.

The back-off in 620 may improve communication for UE 106 by reducing unnecessary PLMN barring when requests are not explicitly rejected, in some embodiments.

Figure 7:
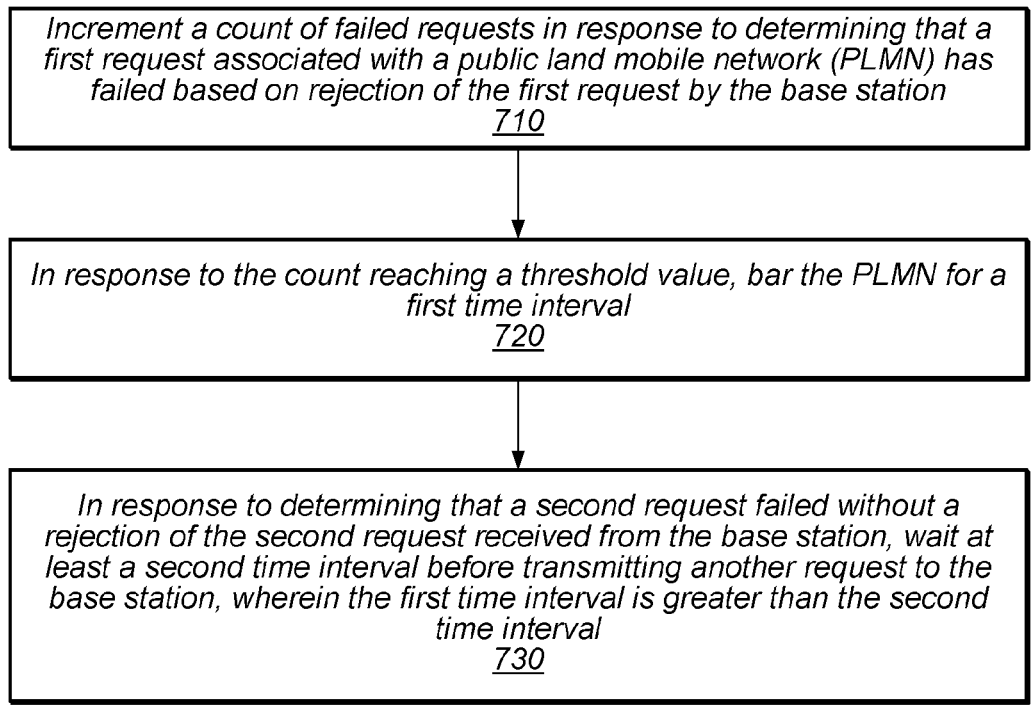
FIG. 7 is a flow diagram illustrating another method for PLMN barring, according to some embodiments.

FIG. 7 is a flow diagram illustrating another method for improved PLMN barring according to some embodiments. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 710, in the illustrated embodiment, a processing element (e.g., in a mobile device) increments a count of failed requests in response to determining that a first request associated with a PLMN has failed based on rejection of the first request by the base station (e.g., in a received wireless communication from the base station). In some embodiments, the processing element is configured not to increment the count for failed requests that do not receive an explicit message from the base station. This may prevent premature barring of a PLMN that has resources available for the mobile device, e.g., in the event that poor wireless conditions cause the message to fail rather than rejection by the base station.

At 720, in the illustrated embodiment, in response to the count reaching a threshold value, the processing element bars the PLMN for a first time interval. Thus, the corresponding mobile device may refrain from communicating via the barred PLMN during the first time interval.

At 730, in the illustrated embodiment, in response to determining that a second request failed without a rejection of the second request received from the base station, the processing element waits at least a second time interval (that is shorter than the first time interval) before transmitting another request to the base station. This may conserve battery power, for example, when wireless conditions are relatively poor. It may allow requests to continue, however, in situations where requests are simply being rejected by the base station (e.g., these requests will receive an explicit rejection, and wireless conditions may be satisfactory, so requests can continue).

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
one or more processing elements configured to:
send request information for a first request to a wireless radio for transmission to a base station, wherein the first request is associated with a public land mobile network (PLMN);
in response to rejection of the first request by the base station, increment a count of failed requests;
in response to the count reaching a threshold value, bar the PLMN such that the apparatus does not use the PLMN for a first time interval;
send request information for a second request to the wireless radio for transmission to the base station, wherein the second request is associated with the PLMN; and
in response to determining that a second request failed without a rejection of the second request being received from the base station, wait at least a second time interval before transmitting another request to the base station associated with the PLMN, without incrementing the count of failed requests, wherein the first time interval is greater than the second time interval.

2. The apparatus of claim 1, wherein the first request and the second request are attach requests.

3. The apparatus of claim 1, wherein the first request and the second request are tracking area update (TAU) requests or service requests.

4. The apparatus of claim 1 wherein the second time interval is configurable.

5. The apparatus of claim 1, wherein the apparatus is configured to wait at least a longer time interval than the second time interval for one or more requests subsequent to the second request that fail without a rejection by the base station.

6. The apparatus of claim 1, wherein the one or more processing elements are further configured to:
determine whether another cell is available for the apparatus at an end of the first time interval.

7. The apparatus of claim 1, wherein the rejection of the first request by the base station is a reject message that indicates a condition value corresponding to a reason for the rejection.

8. The apparatus of claim 1, further comprising the wireless radio.

9. The apparatus of claim 1, further comprising a timer configured to determine the first time interval.

10. The apparatus of claim 1, further comprising:
one or more memories having program instructions stored thereon that are executable by the one or more processing elements;
at least one antenna for performing wireless communication; and
at least one radio coupled to the at least one antenna, wherein the at least one radio is configured to perform communication using at least one radio access technology (RAT).

11. An apparatus, comprising:
one or more processing elements configured to:
send request information for a first request to a wireless radio for transmission to a base station, wherein the first request is associated with a public land mobile network (PLMN);
in response to rejection of the first request by the base station, increment a count of failed requests, wherein the one or more processing elements are configured not to increment the count in response to failed requests to the base station for which a rejection is not received from the base station; and
in response to the count reaching a threshold value, bar the PLMN such that the apparatus does not use the PLMN for a first time interval.

12. The apparatus of claim 11, wherein the one or more processing elements are further configured to, in response to determining that a second request failed without a rejection of the second request received from the base station, wait at least a second time interval before transmitting another request to the base station, wherein the first time interval is greater than the second time interval.

13. The apparatus of claim 12, wherein the one or more processing elements are further configured to determine and wait for telescoping wait intervals for subsequent failed requests to the base station that fail without receiving a rejection from the base station.

14. The apparatus of claim 11, wherein the first request is an attach request or a tracking area update (TAU) request.

15. A non-transitory computer-readable medium having instructions stored thereon that are executable by a computing device to perform operations comprising:
sending request information for a first request to a wireless radio for transmission to a base station, wherein the first request is associated with a public land mobile network (PLMN);
in response rejection of the first request by the base station, incrementing a count of failed requests;
in response to the count reaching a threshold value, barring the PLMN such that the computing device does not use the PLMN for a first time interval;
sending request information for a second request to the wireless radio for transmission to the base station, wherein the second request is associated with the PLMN; and
in response to determining that a second request failed without a rejection of the second request received from the base station, waiting at least a second time interval before transmitting another request to the base station associated with the PLMN, without incrementing the count of failed requests, wherein the first time interval is greater than the second time interval.

16. The non-transitory computer-readable medium of claim 15, wherein the first request and the second request are attach requests, tracking area update (TAU) requests, or service requests.

17. The non-transitory computer-readable medium of claim 15, wherein the second time interval is adjustable.

18. The non-transitory computer-readable medium of claim 15, wherein the operations further comprise:
determining whether another cell is available for the computing device at an end of the first time interval.

* * * * *